United States Patent Office 3,509,832
Patented May 5, 1970

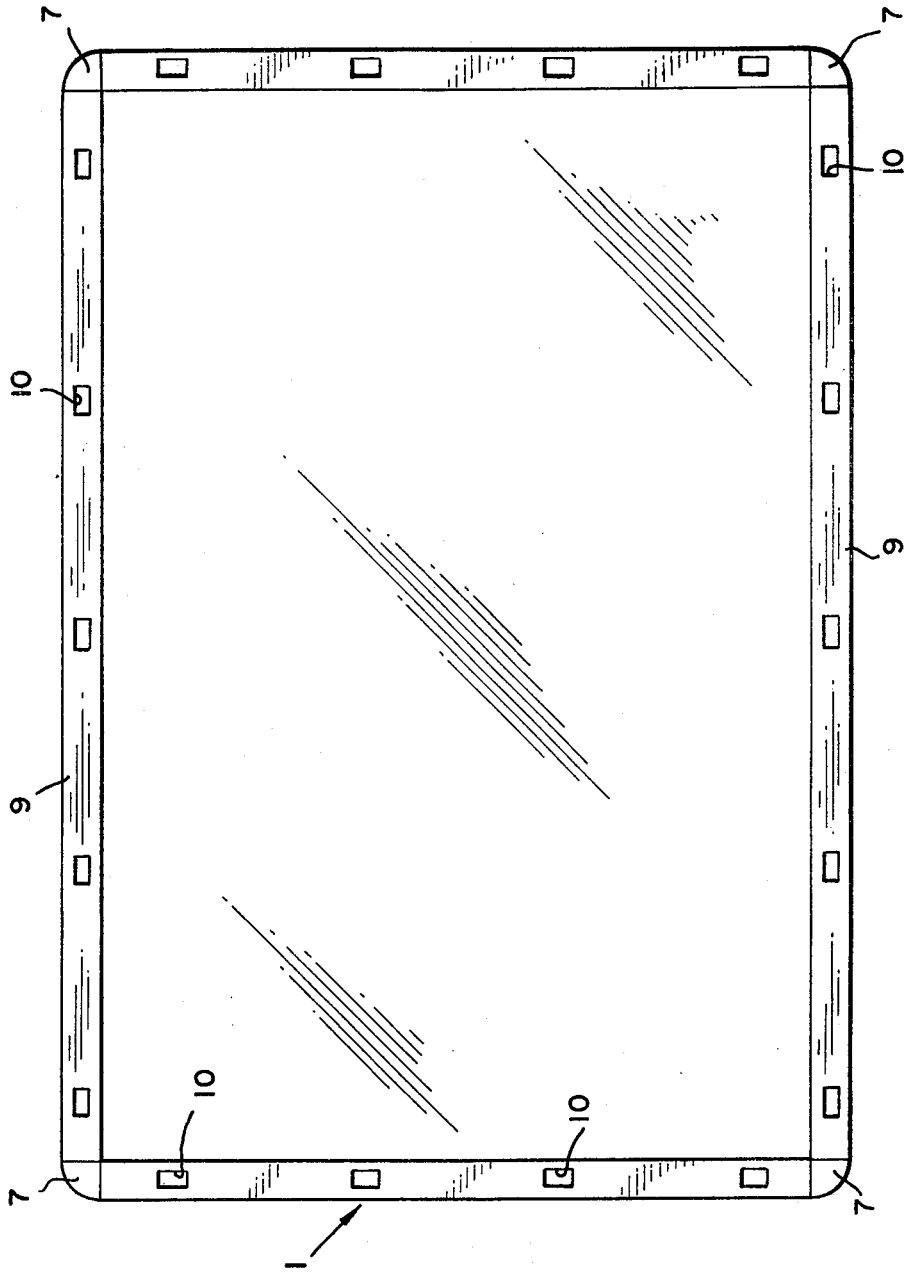

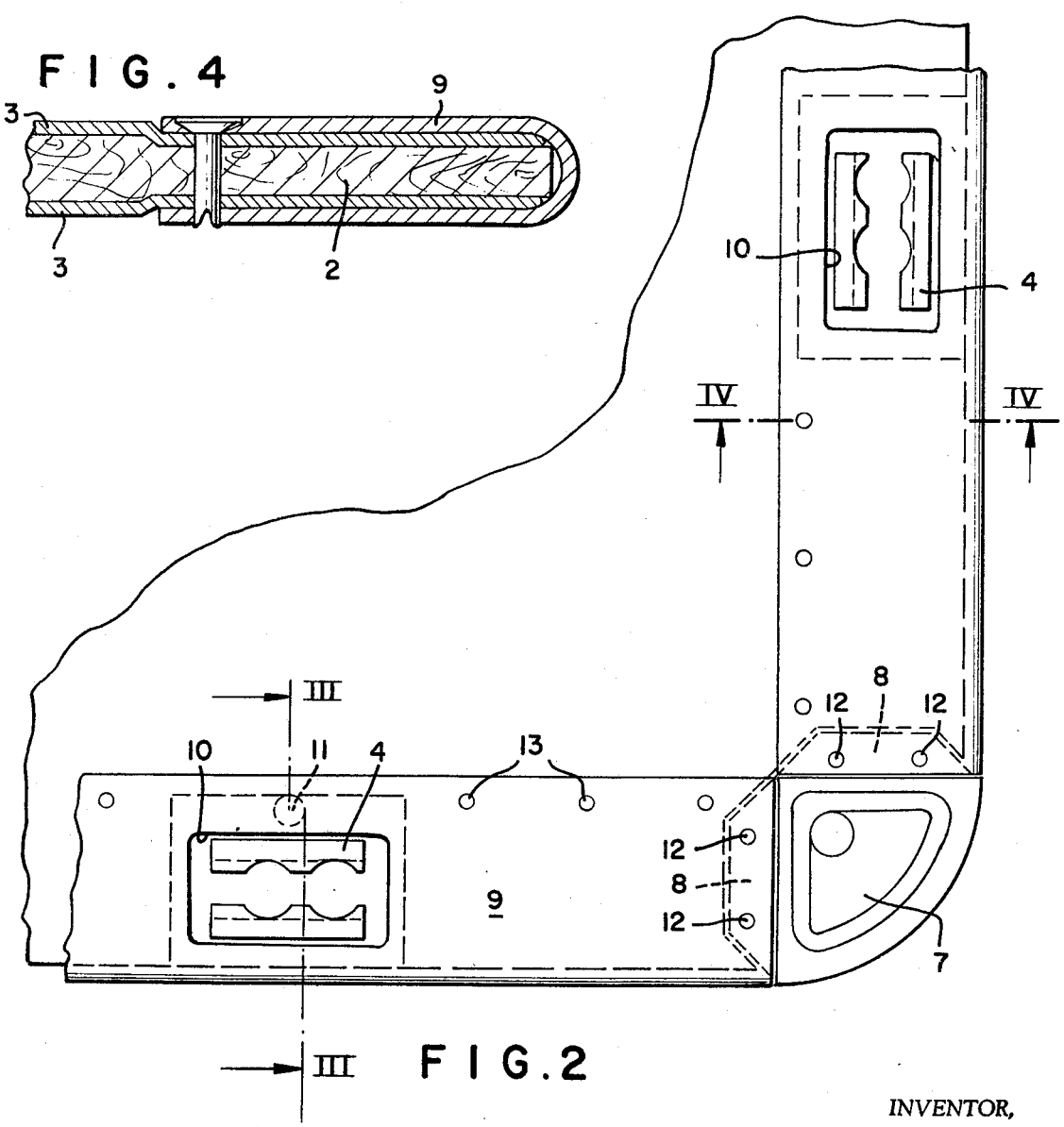

3,509,832
AIRCRAFT CARGO PALLETS
Herbert H. Daisley, Jr., West Islip, N.Y., assignor to Ray, Daisley, Company, Inc., Lindenhurst, N.Y., a corporation of New York
Filed Aug. 9, 1968, Ser. No. 751,532
Int. Cl. B65d *19/00*
U.S. Cl. 108—51          3 Claims

ABSTRACT OF THE DISCLOSURE

A flat pallet for aircraft cargo, the main body of which is formed of a balsa "sandwich" faced top and bottom with laminations of woven glass fiber rovings adhered to the balsa by catalyzed synthetic resin, said body being rimmed by an aluminum alloy channel and provided with fittings as required.

---

Aircraft cargo pallets having the general configuration of the one shown herein have been known, but the main body section has been of plywood (e.g., hardply oil treated Dogulas fir plywood faced with "Masonite" or the like). The balsa sandwich pallets disclosed herein are found to be greatly superior in performance, durability, ease of repair and lightness, all of which factors are of particular importance in an aircraft accessory.

A practical embodiment of the invention is shown in the accompanying drawings, wherein:

FIG. 1 represents a plan view of the complete pallets, certain details being omitted;

FIG. 2 represents a detail plan view of one corner of the pallet, showing a corner piece, tie-down fittings and edge molding, the balance of the pallet being broken away;

FIG. 3 represents a transverse section on the line III—III of FIG. 2; and

FIG. 4 represents a transverse section on the line IV—IV of FIG. 2.

The pallet comprises a main body section 1 of balsa wood 2 which may typically be on the order of one-half inch thickness, faced on its top and bottom surfaces with woven rovings 3 of glass fibers (e.g., Owens-Corning "Aretone" or equivalent) securely bonded to the balsa by the application and curing of a resinous adhesive. A suitable ingredient for the bonding agents is found to be "Plaskon" polyester resin 941, obtained from Marco Chemical Division of W. R. Grace and Company, this being a low viscosity resin containing styrene which may be cured in the presence of air and is recommended for lamination. With the top and bottom surfacing materials in place, the lamination is effected by vacuum and pressure of 8 to 12 p.s.i. to distribute the resin and assure the formation of a strong bond of the glass cloth to the balsa wood. A cure may be completed in 30 minutes at room temperature, for instance.

In a pallet as shown in FIG. 1 there are 18 tie-down fittings 4 disposed at intervals around all four edges, each fitting being located in a recess 5 cut out of the balsa as with a saw, and each fitting having a tongue 6 projecting horizontally into the adjacent balsa wood (FIG. 3). Metallic corner pieces 7 of quadrant shape, with tongues 8 projecting into the balsa as shown in FIG. 2, provide protection and reinforcement for the corners, and each edge is sheathed with a channel 9 of aluminum. The channels are provided with openings 10 permitting accesses to the fittings 4 and each fitting is secured to the adjacent channel and balsa by a screw or rivet 11 passing through the tongue 6. The corner pieces 7 are secured similarly by pairs of rivets 12 passing through the adjacent channel and balsa while additional rivets 13, at suitable intervals, fasten the channels securely along all edges.

It will be noted that the facings 3 extend into the channels 9 to the outer edges of the balsa wood which is compressed within the channels, as shown in FIGS. 3 and 4.

The complete pallet, as shown in FIG. 1, may typically have outside dimensions of 125" by 88". As compared to previously known pallets (e.g., of plywood) the pallet described herein is approximately 88 lbs. lighter, at least equally durable and easier to maintain.

What I claim is:

1. A cargo pallet for aircraft comprising a main body portion of balsa wood faced on both upper and lower surfaces with a lamination including glass fibers in the form of woven roving bonded to the surface of the balsa with a cured synthetic, resin and provided on all edges with protective metal channels, the balsa wood body and its laminations extending into said channels, peripheral portions of said body being recessed and a plurality of tie-down fittings being secured in said recessed portions and within said channels.

2. A pallet according to claim 1 in which the balsa wood body and its laminations are compressed in the channels.

3. A pallet according to claim 1 in which the resin includes a polyester resin containing styrene.

References Cited

UNITED STATES PATENTS

| | | | |
|---|---|---|---|
| 1,242,815 | 10/1917 | Kohler | 52—627 |
| 2,792,164 | 5/1957 | Cauffiel | 228—58 |
| 2,833,003 | 5/1958 | Bourne et al. | 52—627 XR |
| 2,875,117 | 2/1959 | Potchen et al. | 154—128 |
| 3,028,638 | 4/1962 | Coelliner | 52—627 |
| 3,235,040 | 2/1966 | Ellis | 52—623 |
| 3,272,158 | 9/1966 | Barnum | 108—51 |
| 3,298,326 | 1/1967 | Addison et al. | 108—51 |

BOBBY R. GAY, Primary Examiner
G. O. FINCH, Assistant Examiner